US011651346B1

(12) United States Patent
Medina, III et al.

(10) Patent No.: US 11,651,346 B1
(45) Date of Patent: May 16, 2023

(54) POINT OF SALE IMAGE CAPTURE AND TRANSACTIONAL DATA MANAGEMENT SYSTEM AND METHOD

(71) Applicant: United Services Automobile Association (USAA), San Antonio, TX (US)

(72) Inventors: Reynaldo Medina, III, San Antonio, TX (US); William Preston Culbertson, II, San Antonio, TX (US); Susan Elizabeth Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/886,463

(22) Filed: May 28, 2020

(51) Int. Cl.
*G06Q 20/20* (2012.01)
(52) U.S. Cl.
CPC ......... *G06Q 20/209* (2013.01); *G06Q 20/206* (2013.01); *G06Q 20/208* (2013.01)
(58) Field of Classification Search
CPC ... G06Q 20/209; G06Q 20/206; G06Q 20/208
See application file for complete search history.

(56) References Cited

U.S. PATENT DOCUMENTS

| 10,389,983 | B1* | 8/2019 | Fu | H04N 7/181 |
| 2012/0253913 | A1* | 10/2012 | Richard | G06Q 20/36 |
| | | | | 705/14.27 |
| 2017/0132635 | A1* | 5/2017 | Caldera | G06Q 20/065 |
| 2017/0154398 | A1* | 6/2017 | Rambler | G07D 7/0034 |
| 2018/0285848 | A1* | 10/2018 | Crooks | G06Q 20/201 |
| 2020/0286058 | A1* | 9/2020 | Edwards | G06V 20/52 |
| 2020/0320505 | A1* | 10/2020 | Crooks | G06Q 20/3278 |

* cited by examiner

*Primary Examiner* — A. Hunter Wilder
*Assistant Examiner* — Joseph M Mutschler
(74) *Attorney, Agent, or Firm* — Fletcher Yoder, P.C.

(57) ABSTRACT

A system and method for performing a transaction and managing transaction data. The system and method operate by scanning an item for purchase with a point of sale system and obtaining image data of the item with an image capture device of the point of sale system during the scanning. The system and method operate by proceeding to store the image data in a memory of the point of sale system and generating, with a processor of the point of sale system, an association of the image data with purchase data acquired at the point of sale during the purchase. Further, the system and method operate by providing the association, the image data, and the purchase data to a graphical user interface, which displays the image data and the purchase data such that the image data is visually linked with the purchase data based on the association.

20 Claims, 2 Drawing Sheets

FIG. 1

POINT OF SALE IMAGE CAPTURE AND TRANSACTIONAL DATA MANAGEMENT SYSTEM AND METHOD

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A point of sale (POS) is generally understood to reference a place and/or a point in time where a transaction (e.g., a retail or service transaction) is performed. Traditionally, at the point of sale, a provider (e.g., a merchant or service provider) coordinates with a purchaser (also referred to as a customer) to exchange products and/or services for payment. This typically includes some form of documentation of the exchange as well.

As a specific example, a purchaser may identify a desired purchase (e.g., a particular item of merchandise or a particular service), the provider then typically determines an amount owed by a customer for the identified purchase, and the purchaser then indicates the determined amount to the customer. Usually, the price of the desired purchase has already been provided (e.g., via a price tag) but the price is generally confirmed at the point of sale. Further, the provider usually offers the purchaser various options for payment, such as payment via cash, credit, or debit. An invoice may be generated with price and payment options to achieve this. Upon review of the determined amount and agreement by the purchaser, the purchaser typically pays the provider the determined amount via an agreed upon payment method. In some situations, the payment amount may be a modified during the process. Typically, when the transaction is completed, the provider generates a receipt, such as a cash register printout or an electronic receipt (e.g., an emailed receipt). This receipt can be used by the customer as a proof of the purchase, such as when a return is desired.

It is now recognized that improved techniques and systems for facilitating interactions at a point of sale are desirable. For example, it is now recognized that more information and reliable point of sale data is desirable to facilitate management of point of sale transactions and subsequently related activity. Accordingly, the present disclosure is directed to such improved techniques and systems.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, a system for performing transactions and managing transaction data includes a point of sale system configured to facilitate a transaction and disposed at a point of sale. An image capture device of the point of sale system is configured to capture actual image data associated with the point of sale as a part of the transaction. Further, processing circuitry is configured to receive the actual image data and link the actual image data with transactional data obtained during a transaction in which the actual image data is captured. Additionally, a graphical user interface is configured to display an image in association with the transactional data, wherein the image is based on the actual image data.

In an embodiment, a system and method for performing a transaction and managing transaction data is provided. The system and method operate by scanning an item for purchase with a point of sale system and obtaining image data of the item with an image capture device of the point of sale system during the scanning. The system and method operate by proceeding to store the image data in a memory of the point of sale system and generating, with a processor of the point of sale system, an association of the image data with purchase data acquired at the point of sale during the purchase. Further, the system and method operate by providing the association, the image data, and the purchase data to a graphical user interface, which displays the image data and the purchase data such that the image data is visually linked with the purchase data based on the association.

In an embodiment, a system for performing transactions and managing transaction data is provided. The system includes a point of sale system including a barcode scanner configured to emit light toward a good at a point of sale and configured to detect the light reflected from the good to read a barcode associated with the good. An image capture device is integrated with the barcode scanner and configured to capture actual image data of the good in conjunction with the barcode scanner scanning the good. Further, processing circuitry of the system is configured to process the barcode to identify transactional data associated with the good and configured to link the actual image data with transactional data. Additionally, a graphical user interface is configured to display an image including imagery based on the actual image data in a visual correlation with the transactional data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are directed to systems and methods for utilizing image capture via a point of sale device and using the point of sale device to facilitate data management of relevant transactional data (e.g., purchase data), including images (e.g., images of merchandise) captured via the point of sale device or system. In accordance with present embodiments, a point of sale system may be defined as a hardware system for processing payments for goods or services. The point of sale system may utilize software, which may be embedded in the hardware (e.g., including tangible, non-transitory, computer-readable media), to perform certain operations associated with a transaction, such as a purchase or return. The point of sale system, in accordance with present embodiments, may include a terminal that is anchored to a checkout counter (e.g., a typical checkout counter at a retail store) or the point of sale system may include a portable device (e.g., a portable barcode scanner). In some cases, a point of sale system may even include a purchaser or customer point of sale system that cooperates with a provider point of sale system, such as when a mobile phone is employed by a customer for mobile payments. A provider point of sale system may be referred to herein as a managing point of sale (POS) system (or device) and a purchaser point of sale system (e.g., a customer's mobile phone having a mobile payment application stored thereon) may be referred to herein as a purchase authorization point of sale (POS) system (or device).

An embodiment of the present disclosure includes a point of sale system or device that operates to capture actual images of purchases, one or more participants (e.g., customer and/or sales clerk), or even surroundings involved in or otherwise related to the transaction (e.g., a sign, logo, interior decoration, symbol). The point of sale system may employ various devices or components to facilitate a purchase transaction. Specifically, for example, a point of sale system in accordance with present embodiments may include a weighing scale to measure goods, a barcode scanner (e.g., a QR code scanner) to obtain data about a purchase, a cash register to facilitate exchange of funds, a strip reader to facilitate transactions via credit or debit cards, nearfield communication equipment to facilitate mobile payment options, and so forth. In addition, a point of sale system in accordance with present embodiments may include an image capture feature (e.g., a camera, light sensor) to facilitate image capture during the transaction (e.g., purchase transaction). The image capture feature may include a camera positioned appropriately to capture desired images, such as above a purchase area (e.g., above a conveyor belt at a grocery store), extending from or integrated with a cash register to capture an image of the clerk, at a credit/debit card scanner to capture an image of the customer, within a barcode scanner to capture an image of goods being purchased, and so forth.

While present embodiments may include point of sale systems that are initially designed to include image capture features, present embodiments also include retrofitting systems. For example, a traditional barcode scanner may be retrofitted for image capture by adding a camera or adding a light sensor that operates to capture an image based on light emission and reflection used by the barcode scanner during normal operation. This may be part of a retrofit or an efficiency aspect of original equipment. For example, to limit expenses by avoiding incorporation of a typical camera, a more simplified light sensor may be employed to gather light (such as the light emitted by the barcode scanner and reflected off of a scanned item) to obtain image data of goods being scanned. In some embodiments, the sensor may actually limit light gathering to a particular wavelength range associated with the light used for scanning. For example, light in a red wavelength is typically used for barcode scanning and a sensor associated with detecting reflected red light (e.g., to detect the barcode) may be repurposed or added to the barcode scanner to provide image data. By filtering input light, present embodiments may substantially limit the light sensor to the referenced light wavelength range. Accordingly, the image capture function may be substantially limited to capturing images of items that are scanned with the scanning light. However, environmental light or other light may also be used to obtain images in accordance with present embodiments.

In accordance with present embodiments, the images captured using the techniques and systems referenced above may be collected and used along with other purchase data to improve subsequent management of the associated data and/or to facilitate later transactions. For example, in accordance with present embodiments, actual purchase imagery (not a mere stock photo) can be stored for later access. The actual transaction imagery (e.g., actual purchase imagery) may include an image of the specific product that was purchased/returned, aspects of the surroundings of the point of sale (e.g., image data that reveals the purchase/return location), one or more participants in the transaction, and so forth. This actual transaction imagery may be provided as image data which, along with other purchase information, may be stored locally (e.g., in a memory or storage) on the point of sale system and/or transmitted for storage in a remote portion of the system or a separate system/database (e.g., on a cloud server). It should be noted that stock imagery, which may include a captured image of a staged item of the same type as that purchased, may also be associated with the actual imagery.

The image data may be linked with the other transaction data (e.g., purchase data) as part of the storage process and to facilitate retrieval of the image data along with the other transaction data (e.g., price, quantity purchased, transaction participants, location of purchase, nature of goods/services, date and/or time of purchase, relevant return or warranty data), which may facilitate confirmation of relevant aspects of the transaction. For example, the image data may be utilized to confirm a location of purchase (e.g., as indicated by textual purchase data) based on unique physical aspects of the purchase location captured in the image data. In some embodiments, particular confirmation imagery may be stored for comparison with actual image data to facilitate confirmation of the point of sale location. Specifically, for example, a symbol may be stored in a database and associated with a particular point of sale location and a corresponding symbol (a substantially matching symbol) may be provided in the field of view of a camera of a point of sale system such that at least a portion of the corresponding symbol will be captured (e.g., in the background) in the image provided by the camera or sensor of the point of sale system. The symbol captured in the image and the symbol stored as a reference may be compared to confirm a location of the point of sale. Likewise, other environmental aspects may be captured and compared (e.g., a wallpaper pattern, a type of seating in the background, a type of cash register, signage).

As another example of storing and establishing a relationship between the image data and other transaction data, a blockchain (a chain of records stored in blocks that are managed by a distributed network of authorities) may be generated or updated to include the image data along with other data associated with the purchase transaction (e.g., price, quantity purchased, transaction participants, location of purchase, nature of goods/services, date and/or time of purchase, relevant return or warranty data). The blockchain may be maintained across several computers (e.g., including the point of sale system or a component thereof) that are linked (e.g., via a peer-to-peer network) so that the information is distributed and confirmable. Indeed, the blockchain provided in accordance with present embodiments may be defined as a data structure that holds transactional data (e.g., transactional data such as an actual image of a purchased product, location of the associated purchase, the associated purchase price and so forth) in a manner that is accessible and immutable. Thus, the blockchain may serve as a secure, transparent, and decentralized repository of purchase information for providers, purchasers, and third parties. Having a blockchain with this information, including an actual image of a purchased good or the like, may provide a particular benefit in later transactions (e.g., returns).

As noted above, present embodiments include aspects and features related to storing transaction data (e.g., purchase data), including captured image data. It is presently contemplated that such purchase data may be mined or otherwise accessed for numerous purposes, in accordance with present embodiments. In particular, for example, the purchase data may be provided for subsequent review by the purchaser and/or provider via a graphical user interface (GUI). The GUI may operate to provide visual guidance through purchase data. The GUI may be part of the managing point of sale system (e.g., a point of sale terminal) and/or the authorization point of sale system (e.g., a customer mobile device). As an example, a purchaser may wish to audit or simply be reminded of purchases over a particular timeframe (e.g., a month) and the GUI may include relevant purchase data provided alongside captured images of purchased products based on the timeframe.

While a timeframe is referenced as a data assembling criteria (data based upon which other data is assembled for review), other embodiments include assembling criteria, such as purchase location (e.g., a particular store), purchase amount (e.g., a range of purchase values), purchase type (e.g., credit, cash, debit), time of purchase, participant (e.g., name of purchaser), and so forth. Likewise, a provider may wish to search through data based on assembling criteria (e.g., timeframe, location, purchase amount) and use corresponding actual image data for guidance, confirmation, or the like. Indeed, actual images of purchased products may essentially operate within the GUI as bullet points for other purchase data (e.g., price, date of purchase, location of purchase) within a particular assembling criteria. This may be particularly useful when employing a point of sale system for a return transaction. For example, a point of sale system in accordance with present embodiments may be operable to facilitate purchase back by a provider of an item that was previously purchase purchased by the seller. Specifically, the actual image data may be useful for confirmation of the specific item being returned and may also be used for a type of lookup of information. Indeed, as with the original purchase, an actual image of the product being returned may be captured and used to identify other purchase information in the system. For example, if an individual wants to return an item, the individual may be able to take a picture of it and use comparison with the previously captured image to identify where to take the return and perhaps use it as a confirmation/receipt. To achieve this function, present embodiments may include an application or software that enables graphical comparisons and searching capabilities. Thus, the GUI may provide users with the ability to later reference what was purchased, where the purchase occurred, and who was involved in the transaction. Further, the GUI may operate to use captured images to lookup such information. This may be achieved in accordance with present embodiments by the system employing facial recognition for identifying transaction participants or other graphical identification software/techniques for comparing and correlating actual transaction imagery and stock or template imagery to confirm correlations.

Figure 1:
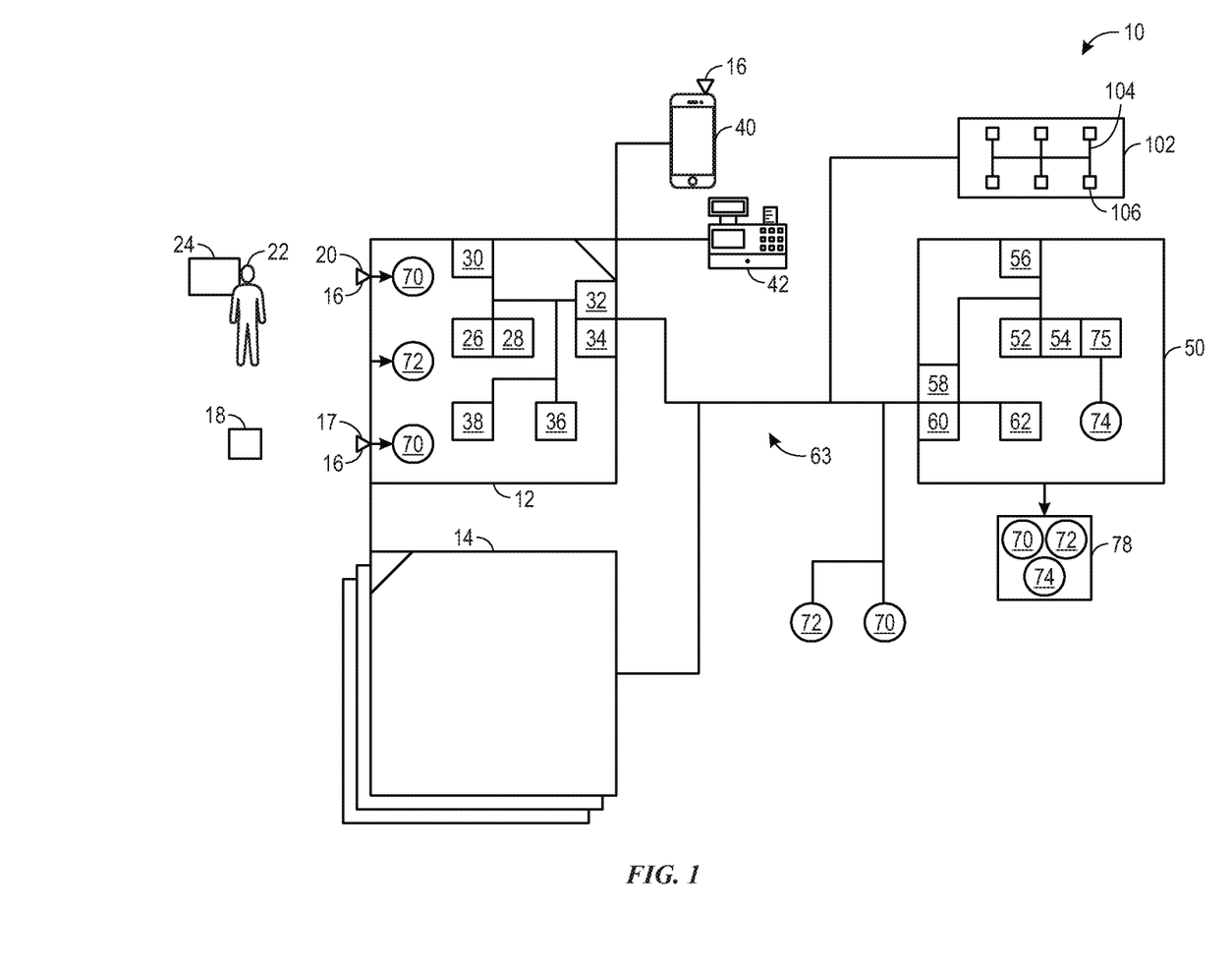
FIG. 1 is a schematic diagram of a transaction management system, in accordance with an embodiment of the present disclosure.

FIG. 1 is a schematic diagram of a transaction management system 10 incorporating a point of sale (POS) system 12 in accordance with embodiments of the present disclosure. The transaction management system 10 may include various computers, terminals, software applications, and networks in accordance with present embodiments. The POS system 12, which may be considered a component of the transaction management system 10, may be defined as a hardware system for processing payments or other transactions for transfer of goods or services. It should be noted that, in addition to processing payments for goods and services, the POS system 12 may also operate to facilitate returns of purchases, inventory management, warehousing, accounting and the like. Each of these functions may be considered a point of sale transaction. Further, it should be noted that the POS system 12 may be considered one of various other systems 14 (e.g., other POS systems or terminals) that operate as part of the transaction management system 10. These various other systems 14 (which may include the POS system 12) may perform specific or varied functions related to POS transactions (e.g., accounting, inventory, sales).

The POS system 12 includes multiple image capture devices 16 (e.g., cameras or light sensors) that operate to capture imagery associated with a POS transaction (e.g., purchase or return of a good). While the illustrated embodiment includes a specific number of image capture devices 16, it should be noted that embodiments in accordance with the present disclosure may include only a single image capture device 16 or numerous image capture devices 16. Further, different image capture devices 16 may each operate to capture multiple different types of images or they may be positioned to capture specific images.

In the illustrated embodiment, a first image capture device 17 of the image capture devices 16 is operable to capture actual images of goods 18 being purchased. This may be facilitated by incorporating the first image capture device 17 into a scanner (e.g., a handheld barcode scanner). Indeed, the image capture device 17 in the illustrated embodiment may include a scanner (e.g., a barcode scanner). Thus, when an item is being scanned for a price, an actual image of the item may simultaneously be captured by the first image capture device 17. A second image capture device 20 of the image capture devices 16 in the illustrated embodiment is operable to capture other information relevant to the POS transaction. Specifically, in the illustrated embodiment, the second image capture device 20 is arranged to capture imagery of one or more participants 22 in the POS transaction and location information 24 (e.g., a code, symbol, or background associated with a particular location). This may be facilitated by positioning the second image capture device 20 in a cash register and/or a viewing terminal (e.g., a screen for viewing the price information during the transaction) to facilitate capturing imagery of a clerk and/or customer involved in the transaction.

The POS system 12 includes a memory 26 and/or storage 28 that stores code (or instructions) and a processor 30 that functions to process the code and control operations in response to the code. The POS system 12 also includes a communication component 32 and input/output (I/O) ports 34 that operate to facilitate communication between the POS system 12 and other aspects of the transaction management system 10. The memory 26, storage 28, processor 30, communication component 30, and/or I/O ports 34 may be integral with or embedded in the POS system 12 to perform certain operations associated with a POS transaction (e.g., a POS purchase transaction).

Further, the POS system 12 may include a display 36 that functions to provide relevant information to parties involved in the transaction. In an embodiment, the display 36 of the POS system 12 may operate to depict visualizations associated with software or executable code being processed by the processor 30. The display 36 may be any suitable type of display, such as a liquid crystal display (LCD), plasma display, or an organic light emitting diode (OLED) display, for example. Additionally, in one embodiment, the display 36 may be provided in conjunction with a touch-sensitive mechanism (e.g., a touch screen).

The POS system 12 may include other hardware components as well. For example, to calculate the amount owed by a customer, the POS system 12 may include various devices 38, such as scales for weighing products, barcode scanners, cash registers, payment terminals for receiving payments, touch screens for providing information, and the like. Further, the POS system 12 may even include purchase authorization POS system 40 that cooperates with a managing POS system 42, such as when a mobile phone (purchase authorization POS system 40) is employed by a customer for mobile payments in conjunction with a payment terminal (a managing POS system 42). The purchase authorization system 40 may include one or more image capture devices 16 that can be used in conjunction with or in place of image capture devices 16 of the managing POS system 42, which may be represented by the first and second image capture devices 17, 20. This may facilitate redundancy and confirmation when disputes arise between transaction participants by allowing comparison of separately acquired images.

It should be noted that the processor 30 may be any type of computer processor or microprocessor capable of executing computer-executable code. Further, the processor 30 may be representative of or include multiple processors that are part of the POS system 12 and that may perform processing operations herein described. The memory 26 and the storage 28 may be any suitable article of manufacture that can serve to store processor-executable code, data, or the like. These articles of manufacture may represent computer-readable media (e.g., any suitable form of memory or storage) that may store the processor-executable code used by the processor 30 to perform the presently disclosed techniques. The memory 26 and the storage 28 may also store data, various software applications, and the like. It should be noted that non-transitory merely indicates that the media is tangible and not a signal.

The I/O ports 34 may be interfaces that may communicatively couple to communication features (e.g., the communication component 32) or peripheral components such as input devices (e.g., keyboard, laser scanner, mouse, microphone), sensors, input/output (I/O) modules, output devices and the like. The communication component 32 may facilitate network communications (e.g., wired or wireless) with remote systems devices. Thus, the I/O ports 34 and the communication component 32 may enable the POS system 12 to provide data to separate features of the transaction management system 10 and to receive data from those separate features.

The POS system 12 is illustrated as being in communication with a central management system (CMS) 50. The CMS 50 includes a memory 52 and/or storage 54 that stores code (or instructions) and a processor 56 that functions to process the code and control operations in response to the code. The CMS 50 also includes a communication component 58 and I/O ports 60 that operate to facilitate communication between the CMS 50 and other aspects of the transaction management system 10, such as the POS system 12. Further, the CMS 50 may include a display 62 that functions to provide relevant information to parties reviewing associated data. In an embodiment, the display 62 of the CMS 50 may operate to depict visualizations associated with software or executable code being processed by the processor 56 to illustrated numerous transactions with different entities, inventory data, accounting data, and the like.

The communication components 32, 58 of the POS system 12 and the CMS 50 may be wireless or wired communication components. Further, these communication components 32, 58 may facilitate communication between the POS system 12 and the CMS 50 using one or more networks 63, which may also be used to facilitate communication with other aspects of the transaction management system 10. In addition to communicating directly with the POS system 12, the CMS 50 may facilitate communication between the various other systems or terminals 14, which may include other POS systems, inventory management systems, accounting systems, and the like. The CMS 50 may obtain data from the various other terminals 14 and supply centralized data to any of the various terminals 14 individually or as a group. Further, the CMS 50 may facilitate terminal-to-terminal communications. For example, the CMS 50 may facilitate routing a communication from one of the various other terminals 14 to the POS system 12 based on the one of the various terminals 14 being used to process a return of a purchase that has been identified as having occurred at the POS system 12. Thus, present embodiments may facilitate decentralization of stored data.

It should be noted that the components described above with regard to the POS system 12 and the CMS 50 are exemplary components and these systems of the present disclosure may include additional or fewer components relative to what is shown. Additionally, as would be understood, it should be noted that the purchase authorization POS system 40 (e.g., mobile computer, mobile device, or desktop computer) may include components similar those described as part of the POS system 12 and the CMS 50, such as a processor, communication component, and memory. Further still, it should be noted that aspects of the transaction management system 10 may include or work in conjunction with a cloud-based computing system, server, or the like. For example, the CMS 50 may represent a bank of servers that perform operations for the various terminals 14, which may include the POS system 12. In such an embodiment, hardware features of the various terminals 14 may be limited to save costs.

As noted above, the POS system 12 operates to capture images associated with a POS transaction. These images may take the form of data that can be displayed or that can be converted back to imagery. Indeed, reference to captured images in the present disclosure may include image data that is translated from an image capture device (e.g., a light sensor used in conjunction with a camera lens) into digital data for later translation back into a viewable version of the captured image. The image data may include digital information and/or electronic signals that are indicative of the captured image or images when properly translated. Thus, such captured images are illustrated in FIG. 1 as actual image data 70. In accordance with present embodiments, the actual image data 70 may be captured by the image capture devices 16, then collected and used along with other POS data 72 (e.g., price, date, location, approval, payment type) to facilitate management of the associated data and/or to facilitate later transactions. For example, actual purchase imagery (e.g., an image of a specific product that was purchased) may be stored as the actual image data 70 along with other purchase information as the POS data 72 locally on the POS system 12 (e.g., in memory 26) and/or transmitted for storage in a separate portion of the transaction management system 10. The separate portion of the transaction management system 10 to which such information is transmitted may include the CMS 50, which may be representative of a separate system/database (e.g., on a cloud server). In the illustrated embodiment, the actual image data 70 and the POS data 72 are illustrated as being transmitted over the one or more networks 63 between the POS system 12 and the CMS 50.

The POS system 12 and/or the CMS 50 may include circuitry or software that facilitates association of relevant data for data management purposes. For example, the actual image data 70 may be linked with the other POS data 72 as part of the storage process and to facilitate retrieval of the actual image data 72 along with other data 74 that might originate from a database, such as database 75 of the CMS 50. As a specific example, the actual image data 70 may be used to identify related POS data 72 and/or the other data 74 that is otherwise related (e.g., a stock image corresponding to the item depicted in the actual image data 70). This may be done by identifying overlapping information between data sets, such as identifying that a purchase price was scanned at the time of acquiring the actual image data 70. The actual image data 70, the other POS data 72, and the other data 74 that is related may cumulatively be referred to as assembled data 78. The assembled data 78 may include the actual image data 70 (e.g., an image of a purchased good, transaction participants, transaction location, relevant symbol), an associated stock image, price of goods, quantity purchased, information about transaction participants, location of purchase, nature of goods/services, date and/or time of purchase, relevant return or warranty data and so forth. This accumulated data 78 may be useful in later analysis of transaction information.

By associating the data items in the assembled data 78 with one another, present embodiments may facilitate confirmation of relevant aspects of the transaction. Indeed, the assembled data 78 may be linked by an algorithm performed by processing circuitry (e.g., processor 56) of the CMS 50 for later retrieval by the POS system 12 (or another such system in communication with the CMS 50) during a return or other transaction. For example, the actual image data 70 may be utilized to confirm a location of purchase indicated by textual purchase data. This may be done based on image comparison techniques, which may be performed by circuitry and/or software of the POS system 12, the various other systems 14, and/or the CMS 50. Specifically, for example, unique physical aspects of the purchase location may be captured in the image data and compared with baseline data (e.g., a standard picture of the location itself or a symbol positioned within the location) stored in a lookup table or database 75 of the CMS 50. Thus, present embodiments may be able to associate the actual image data 70 with the baseline data of the database 75, which is in turn associated with a location. The location may then be compared to the otherwise identified location and confirm a match or correlation therewith. This may confirm that the location is accurately indicated by the textual information.

Present embodiments may also perform a lookup based on the actual image data 70 of a purchased item. For example, in some embodiments, the actual image data 70 may be stored for later comparison with subsequently acquired actual image data 70 (e.g., acquired at a POS system while performing a return) to facilitate confirmation of data related to the item that is being returned (e.g., confirmation of authenticity). Indeed, based on identifying a correspondence between the actual image data 70 acquired during the return and the actual image data 70 acquired during the purchase, all of the assembled data 78 may also be identified and used for purposes of the return transaction. The transaction management system 10 may include circuitry and/or software that operates to compare imagery to identify correlations to facilitate this task. It should be noted that multiple images may be captured (e.g., via one or more of the image capture devices 16) as part of the actual image data 70, which may allow for some level of modeling or capture of three-dimensional aspects of goods that can facilitate identification of similar or same goods based on the associated image data.

The POS system 12 and/or the CMS 50 may also include software or circuitry that is operable to create an immutable and searchable record of transactions. This may be done using blockchain, which is another example of storing and establishing a relationship between the actual image data 70, the other POS data 72, and the other data 74 that is related in accordance with present embodiments. A blockchain 102, which may be described as a chain of records stored in blocks that are managed by a distributed network of authorities, may be generated or updated to include the assembled data 78. The blockchain 102 may include a hash. The blockchain 102 may be maintained across a network 104 of numerous computers 106, which may include the POS system 12 and/or the CMS 50. The computers 106 may be linked via the network 104 (e.g., a peer-to-peer network, which may include network 63) so that the information in the blockchain 102 is distributed and confirmable. Thus, the blockchain 102 provides a secure, transparent, and decentralized repository of POS data for parties of or associated with a transaction (e.g., providers, purchasers, and third parties). Having the actual image data 70 stored in the blockchain 102 directly by the POS system 12 may provide a particular benefit in later transactions, such as the return of purchased items, as discussed above.

Figure 2:
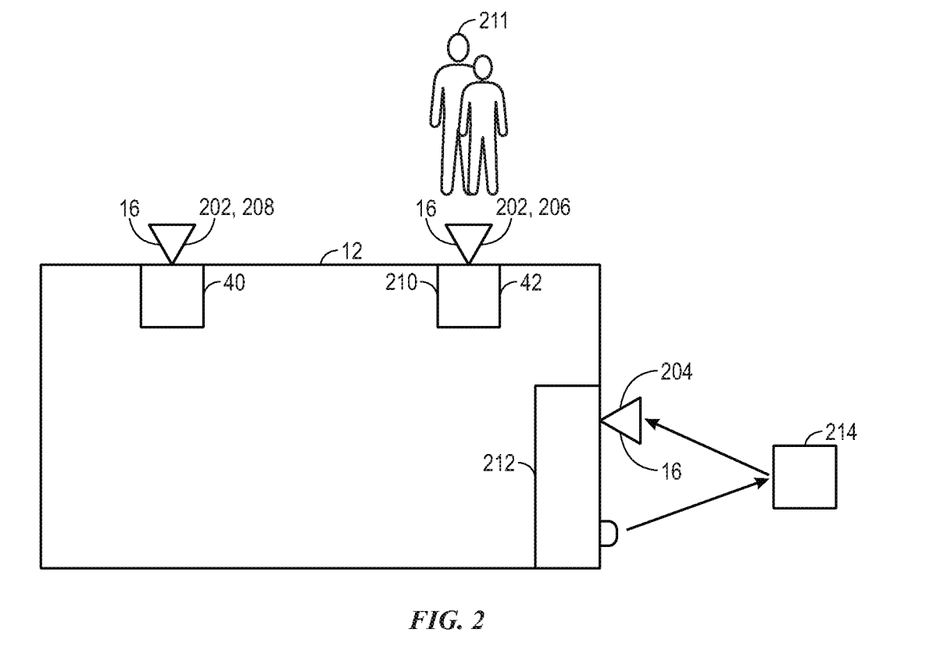
FIG. 2 is a schematic diagram of a point of sale system, in accordance with an embodiment of the present disclosure.

FIG. 2 is an embodiment of the POS system 12 that includes a plurality of image captured devices 16 in accordance with an embodiment of the present disclosure. The POS system 12 may be an original manufacture or a traditional POS device that has been retrofitted. In the illustrated embodiment, the image capture devices 16 include two cameras 202 and a light sensor 204. Each of the image capture devices of FIG. 2 may be designed and arranged to capture particular types of images. For example, a first camera 206 may be positioned on a cash register 210 and angled to capture an image of transaction participants 211 (e.g., both a purchaser and a merchant), which may serve as the actual image data 70. The first camera 206 may also capture background imagery (e.g., a particular type of wall paper or signage around the point of sale) that can also be used as the actual image data 70. A second camera 208 may be part of a purchase confirmation POS system 40 and may be used to capture any of various different images, including images of people involved with the transaction, items being purchased, and the like.

Further, the light sensor 204 of the POS system 12 depicted in FIG. 2 may capture an image of a product being purchased. The light sensor 204 may operate to gather light emitted by a barcode scanner 212 and reflected back by an item 214 being scanned to obtain image data for the item 214 being scanned. In some embodiments, the light sensor 204 may actually limit light gathering (e.g., via a filter) to a particular wavelength range associated with the wavelength of light used for scanning. For example, light in a red wavelength is typically used for barcode scanning and the light sensor 214 may operate to limit detection of light to a range of wavelengths including the red wavelength emitted by the barcode scanner 212. By limiting the detected light to a range of wavelengths, present embodiments may limit captured images to those of the item 214 being scanned with the barcode scanner 212. However, environmental light or other light may also be used to obtain images in accordance with present embodiments. Further, it should be noted that the barcode scanner 212 is representative of any number of light emitting devices that may be used for scanning purposes in accordance with present embodiments.

Figure 3:
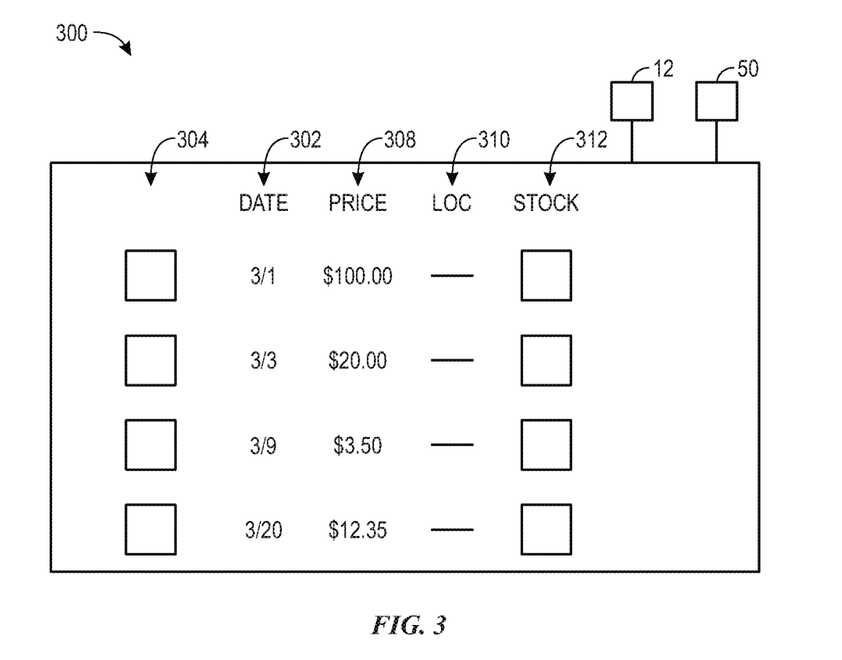
FIG. 3 is a schematic representation of a graphical use interface presented by a point of sale system of a central management system, in accordance with an embodiment of the present disclosure.

FIG. 3 is a schematic representation of a graphical user interface (GUI) 300 in accordance with an embodiment of the present disclosure. The GUI 300 may be displayed by the POS system 12, the CMS 50, or some other feature of the transaction management system 10. As previously noted, software and hardware such as that described with respect to the POS system 12 and the CMS 50 stores, mines, and analyzes transaction data (e.g., purchase data). Thus, transactional data may be provided, via the GUI 300, for subsequent review by parties involved (e.g., purchaser or seller) or otherwise interested (e.g., auditor) in the transaction. The GUI 300 may operate to provide visual guidance through transactional data.

The GUI 300 may be part of or displayed on the managing POS system 42 and/or the authorization POS system 40. Thus, a user may employ these systems to evaluate or review data based on a data assembling criteria 302 (e.g., a timeframe). As an example, a purchaser may wish to audit or simply be reminded of purchases over a particular timeframe (e.g., a year) and the GUI 300 may include relevant purchase data provided alongside captured images of purchased products based on the timeframe. While a timeframe is referenced as the data assembling criteria 302 (data based upon which other data is assembled for review), other embodiments include assembling criteria 302, such as purchase location, purchase amount, purchase type, time of purchase, participant, and so forth. In the illustrated embodiment, the assembling criteria 302 is illustrated as a range of dates.

Actual images 304 of purchased products, locations, transaction participants and the like may essentially operate within the GUI 300 as bullet points for other transactional data (e.g., price, date of purchase, location of purchase) within the assembling criteria 302 that has been selected. This may be particularly useful when employing the POS system 12 for a return transaction. For example, the POS system 12 may be operable to facilitate return of an item to a provider that was previously purchased from the provider by the seller. In such a situation, the actual image 304 (which includes or is based on the actual image data 70) may be useful for visual confirmation of the specific item being returned and may also be used to facilitate looking up related information. For example, an actual image of the product being returned (and corresponding actual image data 70) may be captured and used to identify other purchase information in the system by comparing the newly acquired actual image data 70 with previously stored actual image data 70 to identify information associated with the purchase of the specific item being returned. To achieve this function, the POS system 12 and/or the CMS 50 may include an application or software that coordinate with one or more processors 30, 56 to enable graphical comparisons and searching capabilities. Thus, the GUI 300 may provide users with the ability to later reference what was purchased, where, and who was involved. In the illustrated embodiment, the GUI 300 is displaying actual images 304 arranged according to date (which is the assembling criteria 302) along with price 308, location of transaction 310, and stock images 312 (e.g., a stock pictures of the same types of items illustrated in the actual images 304). By including the stock images 312 for comparison to the actual images 304, a user can more easily confirm via visual comparison that there is no confusion with respect to certain data. For example, the stock images 312 may be associated with database information that was subsequently associated with data captured at the point of sale, whereas the actual images 304 may be part of the data captured at the point of sale. Thus, comparison of the images may confirm or refute overlap between the separate sets of data.

Present embodiments are believed to improve upon traditional point of sale mechanisms by providing image capture, analysis, comparison and review capabilities. Further, present embodiments may be employed to retrofit traditional systems to improve their operation. In view of the features and functionality described in the present disclosure, it is believed that operations related to relevant transactions will be more secure and efficient. In particular, for example, returning previously purchased items will be facilitated by allowing confirmation and lookup, as described. Other advantages may include the ability to implement various types of discounts, loyalty schemes, stock control, and auditing using the actual images (actual image data).

While only certain features and embodiments have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for performing transactions and managing transaction data, the system comprising:
    a point of sale system configured to facilitate a transaction and disposed at a point of sale, wherein the point of sale system comprises a managing point of sale system configured to be operated by a provider and a purchase authorization point of sale system configured to be carried by a purchaser;
    an image capture device of the purchase authorization point of sale system, wherein the image capture device is configured to capture actual image data associated with the point of sale as a part of the transaction, wherein the actual image data comprises imagery of a good being transferred as part of the transaction and aspects of surroundings of the point of sale;
    processing circuitry configured to receive the actual image data and link the actual image data with transactional data obtained during the transaction in which the actual image data is captured, to access baseline imagery associated with a location in a system database, and to compare the baseline imagery to the imagery of the aspects of the surroundings of the point of sale to identify the location of the transaction; and
    a graphical user interface configured to display the actual image data in association with the transactional data.

2. The system of claim 1, comprising:
    a terminal of the managing point of sale system and an additional image capture device coupled to the terminal and configured to capture additional actual image data associated with the point of sale as part of the transaction;
    wherein the processing circuitry is configured to receive the additional actual image data and link the additional actual image data with the actual image data and the transactional data;
    wherein the graphical user interface is configured to display an image and the actual image data in association with the transactional data, wherein the image is based on the additional actual image data.

3. The system of claim 2, wherein the terminal comprises a cash register.

4. The system of claim 2, wherein the additional actual image data comprises imagery of a participant in the transaction at the point of sale.

5. The system of claim 1, comprising a scanner that includes an emitter configured to emit light within a wavelength range, wherein an additional image capture device is integrated with the scanner and is configured to capture additional actual image data associated with the point of sale as part of the transaction.

6. The system of claim 5, wherein the scanner comprises a barcode scanner and the additional image capture device comprises a light detector configured to detect the light and filter additional light that is outside of the wavelength range.

7. The system of claim 1, wherein the processing circuitry is configured to facilitate transfer of information between the point of sale system and an additional point of sale systems.

8. The system of claim 1, comprising a network of computers including the point of sale system, wherein the network of computers is configured to maintain a blockchain that incorporates the actual image data linked with the transactional data.

9. The system of claim 1, wherein the image capture device is configured to capture the aspects of the surroundings of the point of sale by capturing imagery of a party of the transaction, environmental aspects of the point of sale, an identifying feature of the point of sale, or any combination thereof.

10. The system of claim 1, wherein the graphical user interface is part of the managing point of sale system.

11. A system for performing transactions and managing transaction data, the system comprising:
    a point of sale system configured to facilitate a transaction and disposed at a point of sale, wherein the point of sale system comprises a managing point of sale system configured to be operated by a provider and a purchase authorization point of sale system configured to be carried by a purchaser;
    an image capture device of the purchase authorization point of sale system, wherein the image capture device is configured to capture actual image data associated with the point of sale as a part of the transaction, wherein the actual image data comprises imagery of a good being transferred as part of the transaction and aspects of surroundings of the point of sale;
    a terminal of the managing point of sale system and an additional image capture device coupled to the terminal and configured to capture additional actual image data associated with the point of sale as part of the transaction;
    processing circuitry configured to receive the actual image data and link the actual image data with transactional data obtained during the transaction in which the actual image data is captured, and to receive the additional actual image data and link the additional actual image data with the actual image data and the transactional data; and
    a graphical user interface configured to display the actual image data in association with the transactional data, and to display an image and the actual image data in association with the transactional data, wherein the image is based on the additional actual image data.

12. The system of claim 11, wherein the terminal comprises a cash register.

13. The system of claim 11, comprising a scanner that includes an emitter configured to emit light within a wavelength range, wherein a scanner image capture device is integrated with the scanner and is configured to capture scanner actual image data associated with the point of sale as part of the transaction.

14. The system of claim 13, wherein the scanner comprises a barcode scanner and the scanner image capture device comprises a light detector configured to detect the light and filter additional light that is outside of the wavelength range.

15. The system of claim 11, wherein the additional actual image data comprises imagery of a participant in the transaction at the point of sale.

16. The system of claim 11, wherein the processing circuitry is configured to facilitate transfer of information between the point of sale system and an additional point of sale systems.

17. The system of claim 11, comprising a network of computers including the point of sale system, wherein the network of computers is configured to maintain a blockchain that incorporates the actual image data linked with the transactional data.

18. The system of claim 11, wherein the image capture device is configured to capture the aspects of the surroundings of the point of sale by capturing imagery of a party of the transaction, environmental aspects of the point of sale, an identifying feature of the point of sale, or any combination thereof.

19. The system of claim 11, wherein the graphical user interface is part of the managing point of sale system.

20. The system of claim 11, wherein the processing circuitry is configured to access baseline imagery associated with a location in a system database and to compare the baseline imagery to the imagery of the aspects of the surroundings of the point of sale to identify the location of the transaction.

* * * * *